Patented Sept. 3, 1929.

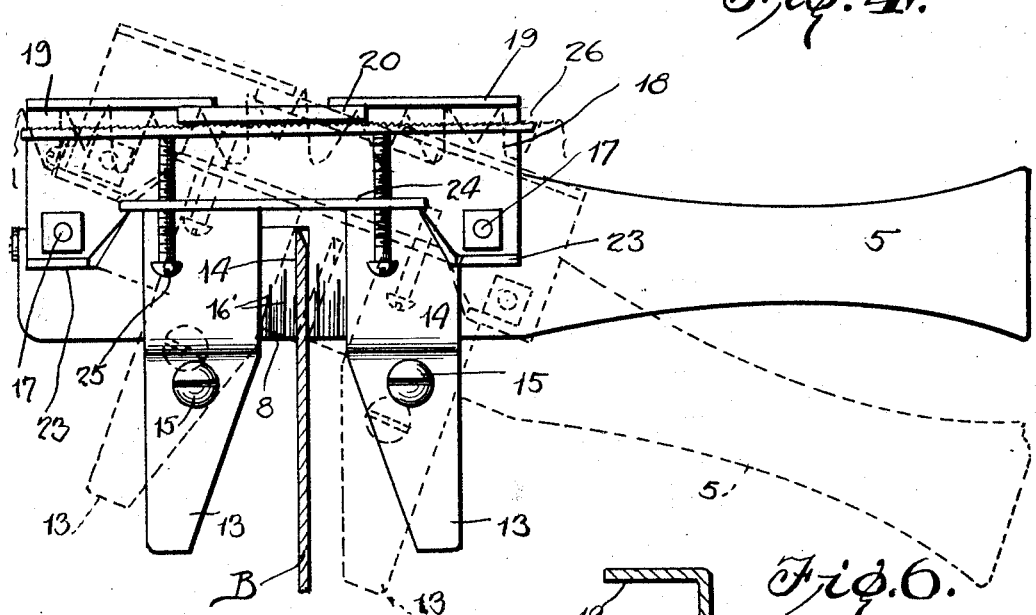
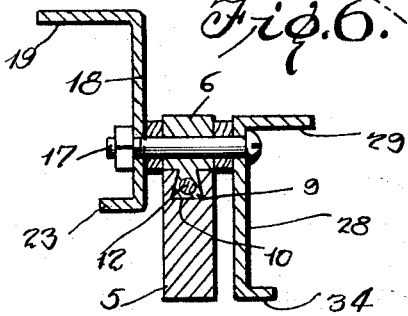
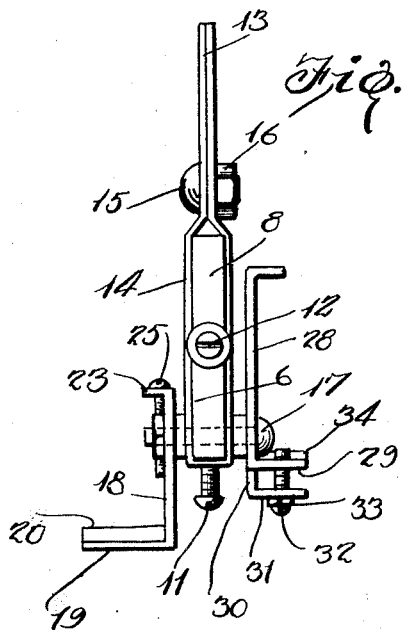
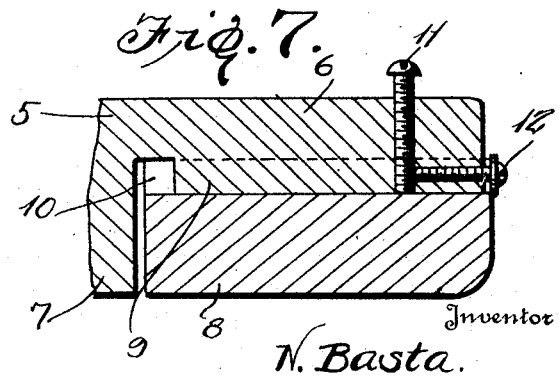

1,727,226

UNITED STATES PATENT OFFICE

NIKOLA BASTA, OF VANCOUVER, BRITISH COLUMBIA, CANADA.

SAW-SETTING TOOL.

Application filed July 30, 1926. Serial No. 126,053.

This invention relates to a device for facilitating setting, gaging and jointing the teeth of large saws, and has particular reference to an improved device of this kind adapted to be held in the hands of the operator when in use, with the saw secured in a fixed or permanent position.

The primary object of the present invention is to provide a device of the above kind which is extremely simple and durable in construction as well as efficient in operation.

A further object is to provide a tool for facilitating setting of saw teeth wherein the saw teeth are adapted for reception between a pair of cooperating jaw members, one of which is adjustable toward and away from the other for accommodating saw blades having teeth of different thicknesses.

A further object is to provide a tool of the above kind which may be employed for setting, gaging and jointing the teeth of saws with facility and ease and without the requirement of special skill.

Still another object is to provide simple and improved means for facilitating filing the points of both the cutting and raker teeth of saws to the required degree whereby the raker teeth will have the required proper length relative to the cutting teeth.

A still further object is to provide a saw set including a handle or shank provided with cooperating fixed and adjustable jaws for accommodating saw teeth of varying thicknesses therebetween, and adjustable gage members of improved form adjustable to various distances at opposite sides of the cooperating faces of the jaw whereby the angle of set of the saw teeth may be varied to suit requirements.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view of a saw set, gage and jointing tool constructed in accordance with the present invention and illustrating the same in use for gaging the length of the raker teeth of a saw;

Figure 4 is a view somewhat similar to Figure 1 looking at the opposite side of the tool and illustrating the same in use when filing the points of the saw teeth and setting saw teeth;

Figure 5 is an end elevational view looking toward the left of Figure 1 with the device inverted;

Figure 6 is a vertical transverse section taken substantially upon line 6—6 of Figure 1; and Figure 7 is a fragmentary longitudinal sectional view of the device shown in Figure 1 for revealing details of construction.

Figure 1:
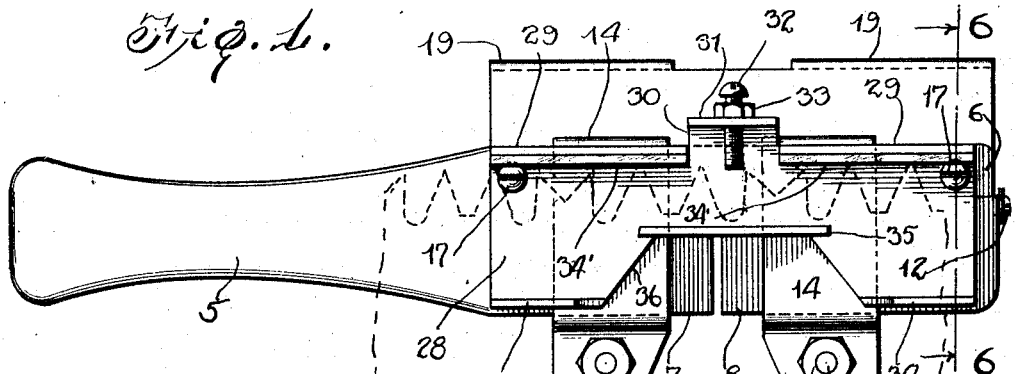

Referring more in detail to the drawings, the present invention comprises a metal bar formed at one end to provide a handle or shank 5, and having its other end reduced in width by cutting the same away at its lower edge portion so as to form a forwardly projecting arm 6 co-extensive with the handle or shank 5. By so reducing the bar, a fixed inner jaw 7 is formed on the outer end of the handle and at the inner end of the arm 6, and longitudinally adjustable on the arm 6 is a slidable outer jaw 8, the inner end of which cooperates with the outer end of the fixed inner jaw 7 for forming an intervening space of variable width for reception of the saw teeth being set, as will presently become apparent. As shown clearly in Figures 6 and 7, the arm 7 is provided along its lower edge with a dove-tail rib 9 which slidably fits in a correspondingly formed dove-tail groove 10 provided in the upper longitudinal edge of the outer adjustable jaw 8. Means is provided for securing the adjustable jaw 8 in any desired set position relative to the fixed jaw 7, and as shown, this means may consist of a set screw 11 threaded through the arm 6 in the plane of the latter and arranged to have its lower end impinge against the adjacent edge of the jaw 8 at the bottom of the groove 10. Obviously, when the screw 11 is threaded downwardly into engagement with the adjustable jaw 8, the latter will be effectively retained from sliding movement after being properly adjusted, while upon loosening said screw 11, the jaw 8 may be freely slid on the arm 6 and relative to the jaw 7 for varying the distance between the cooperating faces of the jaws as may be found necessary. To avoid any possibility of the jaw 8 accidentally moving from adjusted position by reason of accidental loosening of the screw 11, a further set screw may be threaded into the outer end of the arm 6 at right angles to the set screw 11 as shown at 12, the inner end of the set screw 12 being arranged to impinge against the shank of the screw 11 for locking the latter against accidental turning. The turning of the screw 11 is of course permitted upon loosening the set screw 12. The jaw 7, arm 6 and adjustable jaw 8, together, form what may be termed the head of the tool proper, such head being carried by one end of the handle 5, and adjustably mounted on this head of the tool proper for movement longitudinally of the head and handle and laterally toward and away from each other, are a pair of depending gage elements or fingers 13, one of which is arranged at each side of the space which is left between the adjacent inner ends of the jaws 7 and 8 for reception of the saw teeth when the latter are being set. The fingers 13 are alike in construction and each is preferably formed from a centrally return bent strip of sheet metal having its intermediate portion formed to provide an open loop 14 slidably embracing the head of the tool proper, the ends of the strips being brought together in contiguous relation to form the depending or projecting saw blade contacting portions of the fingers. As shown, a bolt 15 is extended through these contiguous free end portions of the strips, and a nut 16 is threaded upon the shank of the bolt so that the ends of the strip may be tightly drawn together for clamping the loop 14 tightly in engagement with the tool head whereby the contact finger is effectively retained in adjusted position at the desired distance from the space between the cooperating faces of the jaws. Obviously, by loosening the nut 16, the free end portions of the strip forming the finger 13 will tend to separate, the same being resiliently tensioned for this purpose, so that the loop 14 will become lose on the tool head for being readily adjusted longitudinally thereon. As shown clearly in Figures 1 and 4, the inner edges of the fingers 13 are beveled in downwardly diverging relation, and suitable parallel transverse graduations or gage lines 16 are provided on the side surfaces of the jaws 7 and 8 for cooperation with the straight transverse inner edges of the loop members 14, whereby accurate setting of the fingers 13 at the required similar distances to opposite sides of the space between the jaw faces of the jaws 7 and 8, is facilitated. In using the tool for setting the teeth of a saw blade, the jaw 8 is adjusted relative to the jaw 7 so that the required space is left between the cooperating faces of said jaws for snugly accommodating the teeth of the saw blade, thus adapting the tool for use in connection with saw blades of different thicknesses. When the adjustable jaw has been properly adjusted for reception of the teeth of a particular saw whose teeth are being set, the tool is disposed transversely of the saw blade as illustrated in Figure 4, the saw blade being held in a fixed or stationary position as well as inverted by clamping the same in a vise or the like. The fingers 13 are then adjusted the required distance apart, depending upon the angle at which the teeth are to be set relative to the body of the saw blade, whereupon the tool is tilted in one direction until one of the fingers 13 abuts the saw blade. This results in this particular tooth being bent laterally at the required angle relative to the saw blade. The tool is then slid along the saw blade to the next tooth to be set, whereupon the tool is tilted in the reverse direction so that the next tooth is bent laterally in the opposite direction, the other finger 13 being then brought into contact with the opposite face of the saw blade. This operation is repeated until all of the saw teeth have been set in the required manner as is well known in the art. The saw blade is indicated at B, while the teeth are indicated at T.

Bolted as at 17 to one side of the tool head by means of bolts passing through the inner end of the fixed jaw 7 and the outer end of the arm 6 of a plate 18 which is vertically disposed parallel with the plane of the tool head and which has a relatively wide horizontal and outwardly directed flange 19 on its upper edge, the bolts 17 passing through apertures in the lower portion of the plate 18 so that the flange 19 is positioned at an elevation above the upper edge of the tool head as clearly illustrated in Figure 6. The intermediate portion of the flange 19 is cut away so as to leave a slot that is bridged by a plate 20 having a longitudinal elongated slot 21 therein. The plate 20 is applied to the underside of the flange 19 so that the ends of said plate 20 overlap the adjacent inner ends of the spaced portions or sections of the flange 19 as shown clearly in Figure 4, and the ends of the slotted plates 20 are attached to the sections of the flange 19 by means of stud screws or bolts 22 so as to be rigidly maintained in place. The plate 18 is provided at its lower edge and adjacent its ends with a pair of relatively narrow horizontally aligned and lateral outwardly projecting flanges or lugs 23, of similar width but considerably narrower than the flange 19, while a longer outwardly directed horizontal flange 24 similar in width to the width of the flanges 23 is provided on the plate 18 between the flanges 23 and at an elevation above said flanges 23 but below the flange 19. The flanges 24 and 23 are of such width that when the tool is placed beside the saw blade with the outer free edges of the flanges 23 and 24 contacting the side surface of the saw blade, and the sections of the flange 19 resting upon the points of the longer cutting teeth of the saw blade, the raker teeth of the blade will be properly disposed to project through the slot 21 in the plate 20, whereby, upon reciprocation of a file on the upper surface of the plate 20 transversely of the tool will result in filing the raker teeth down to the required length so that they will have the proper length relative to the length of the cutting teeth.

Adjustably threaded through vertical openings in the ends of the longer horizontal flange 24 are a pair of set screws 25 adapted to be threaded upwardly so as to impinge against the underside of a file 26 for firmly securing the latter in place against the under surface of the slotted plate 20 beneath the flange 19. With the file 26 secured in place in this manner and the tool disposed beside the saw blade so that the file rests upon the points of the longer cutting teeth, the tool may be reciprocated for filing the cutting teeth down to their required length prior to the above described operation of filing the raker teeth of the saw blade. It will be noted that the flange 24 is provided by slitting the plate 18 at spaced points upwardly from its lower edge so as to leave a freed intermediate portion which is bent at right angles to the body of the plate 18 and reduced in width so that the flange 24 is of the required width. This results in the provision of a relatively long slot 27 in the intermediate portion of the lower edge of plate 18 so as to provide clearance whereby the saw teeth may be properly engaged in the space between the jaws 7 and 8, with the flange 24 located at a sufficiently high elevation to not interfere with the insertion of the teeth between the jaws as will be apparent from viewing Figure 4.

Figure 2:
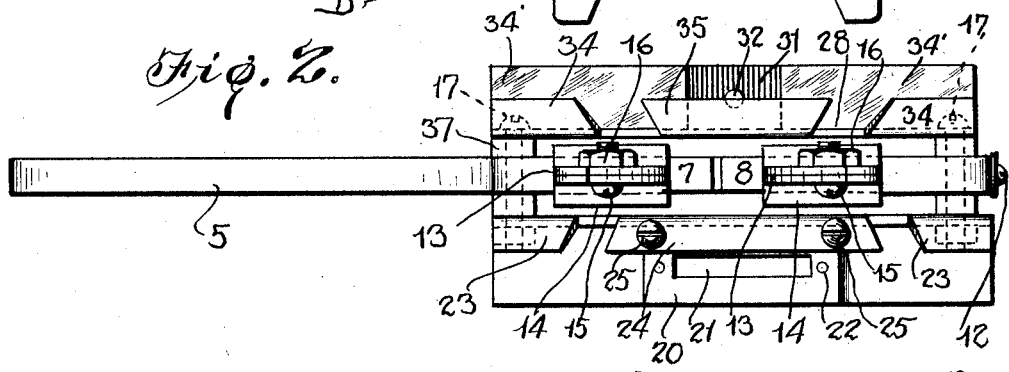
Figure 2 is a bottom plan view of the device shown in Figure 1.
Figure 3:
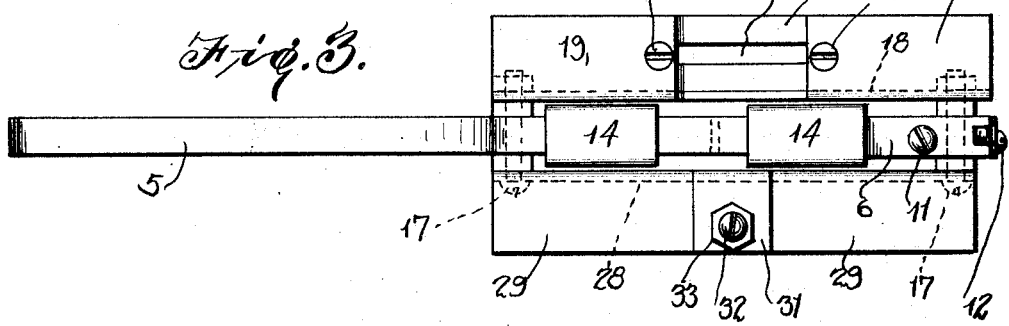
Figure 3 is a top plan view thereof.

Disposed at the opposite side of the tool head is another plate 28 which is also fixed to the tool head by means of the bolts 17 when passed therethrough. However, the bolts 17 pass through the upper portion of the plate 28 so that the latter is fixed in position at a lower elevation than the plate 18 so that it will not interfere with the reciprocation of the file on the upper surface of the slotted plate 20 as mentioned above. This plate 28 is provided with outwardly directed spaced horizontally alinged and horizontally disposed flanges 29, said flanges 29 being relatively wide and extending laterally from the upper edge of the plate 28 as clearly shown in the several views. Extending upwardly from the intermediate portion of the plate 28 between the adjacent ends of the flanges 29 is a projection 30, the upper end of which is bent at right-angles and outwardly to form a horizontal flange 31 disposed between and at an elevation above the flanges 29 as clearly seen in Figure 1. Adjustably threaded through a vertical opening in the flange 31 is a set screw 32 on which is threaded a jam nut 33 arranged to impinge against the upper surface of the flange 31 for locking the screw 32 in any desired vertically adjusted position. The screw 32 is of sufficient length to depend at its lower end slightly below the plane of the lower surfaces of the teeth contacting plates 34 applied to the under surfaces of the flanges 29 as shown clearly in Figures 1 and 2. These teeth contacting plates 34 are formed of some material, such as glass, capable of being placed in contact with the points of the saw teeth as shown in Figure 1 without blunting or otherwise objectionably damaging the same. The plate 28 is further provided at its ends and upon its lower edge with a pair of horizontally aligned laterally directed and horizontal flanges 34 which are narrower than the flanges 29, while a further outwardly directed horizontal flange 35 is provided on the plate 28 intermediate the flanges 34 but at an elevation above the latter as well as below the flanges 29. The flange 35 is formed by slitting the plate 28 and then directing the intermediate freed portion laterally so as to provide a slot 36 in the lower edge of the plate 28 for furnishing sufficient clearance to permit entrance of the saw teeth into the space between the jaws 7 and 8. Of course the freed portion of the plate 28 is reduced in width so that the flange 35 corresponds in width to the width of the narrower flanges 34 whereby, when the tool is placed beside the saw blade with the points of the longer cutting teeth of the saw blade engaging the under surfaces of the plates 34, the screw 32 will be properly positioned for engaging, at its lower end, with the points of the shorter raker teeth. By adjusting the set screw 32 in a predetermined manner, the raker teeth can be accurately gaged as to length so that the same will have the proper length, after being filed, relative to the length of the cutting teeth. As the difference in length between the cutting and raker teeth of saws may vary slightly, the use of an adjustable element in the nature of the set screw 32 is desirable. It is further noted that the flange 35 is so disposed relative to the lower edges of the jaws 7 and 8 as to form a contact or gage plate against which the teeth of the saw rest when inserted between the jaws for being set. In this manner, insertion of the teeth between the jaws is limited to the desired distance so that the teeth of the saw blade alone will be bent in the setting operation, bending of the blade being prevented by reason of the fact that excessive insertion of the blade between the jaws is prevented by the teeth of the saw blade coming in contact with the under surface of the flange 35.

The teeth contacting plates 34 are preferably applied to the under sides of the flanges 29 by gluing or the like, and suitable spacers 37 are placed on the shanks of the bolts 17 between the head of the tool and the plates 18 and 28 for maintaining the latter in sufficiently spaced relation to the head of the tool for allowing the adjustment of the fingers 13 relative to the head of the tool, it being apparent that the plates 18 and 28 are disposed outwardly of the sides of the loops 14 upon viewing Figures 1, 3, 4 and 5.

In the foregoing description the various uses of the tool have been described in detail, and in view thereof it is believed that the construction and operation as well as the advantages of the invention will be readily understood and appreciated by those skilled in the art.

It will be noted that the device embodies a very simple, compact and durable relation and cooperative arrangement of elements, such as will require a minimum amount of time in shifting the tool for changing from one operation to another.

Minor changes may be made without departing from the spirit and scope of the invention as claimed.

What I claim as new is:—

In a tool of the character described, comprising a handle, a fixed jaw, and a movable jaw on one end thereof, contacting fingers to limit the inclination of a saw blade consisting of return bent strips of sheet metal having their intermediate portions formed to provide loops embracing the head and projecting free end portions adapted to be drawn into contiguous relation for tightening the loops on the head and maintaining the fingers in adjusted position, and means for drawing the free ends of the contact finger-forming strips into contiguous relation.

In testimony whereof I affix my signature.

NIKOLA BASTA.